(12) United States Patent
Avrunin et al.

(10) Patent No.: US 6,523,008 B1
(45) Date of Patent: Feb. 18, 2003

(54) METHOD AND SYSTEM FOR TRUTH-ENABLING INTERNET COMMUNICATIONS VIA COMPUTER VOICE STRESS ANALYSIS

(76) Inventors: Adam Avrunin, 3305 Brixworth Pl., Atlanta, GA (US) 30319; Matthew DelGiorno, 5801 Nicholson La., #1430, Rockville, MD (US) 20852

(*) Notice: Subject to any disclaimer, the term of this patent is extended or adjusted under 35 U.S.C. 154(b) by 0 days.

(21) Appl. No.: 09/506,987

(22) Filed: Feb. 18, 2000

(51) Int. Cl.[7] .......................... G01L 17/00; G01L 21/00
(52) U.S. Cl. ...................................... 704/273; 704/270
(58) Field of Search ............................... 704/270, 273, 704/275, 246, 231, 243; 382/118; 434/118

(56) References Cited

U.S. PATENT DOCUMENTS

| | | | | |
|---|---|---|---|---|
| 3,971,034 A | * | 7/1976 | Bell, Jr. et al. .................. | 346/1 |
| 5,596,994 A | * | 1/1997 | Bro ............................. | 128/732 |
| 5,853,005 A | * | 12/1998 | Scanlon ................. | 128/662.03 |
| 6,006,188 A | * | 12/1999 | Bogdashevsky et al. ..... | 704/270 |
| 6,055,501 A | * | 4/2000 | MacCaughelty .............. | 74/272 |
| 6,091,835 A | * | 7/2000 | Smithies et al. ............. | 382/115 |
| 6,151,571 A | * | 11/2000 | Pertrushin ..................... | 704/209 |
| 6,249,809 B1 | * | 6/2001 | Bro ............................. | 709/217 |
| 6,363,346 B1 | * | 3/2002 | Walters ....................... | 704/231 |

* cited by examiner

*Primary Examiner*—Susan McFadden
(74) *Attorney, Agent, or Firm*—Adam Avrunin

(57) ABSTRACT

A method for truth-enabling communications over a computer network using computer voice stress analysis. A sender creates a text message at a first computer of the computer network. The sender also enters into the first computer speech input indicating the veracity of the text message. For example, the speech input may indicate the veracity of the text message through an explicit assertion that the sender believes the text message to be truthful. By applying computer voice stress analysis to the speech input, a computer voice stress analysis program determines the veracity of the text message. The text message and an indication of the veracity of the text message may both be sent over the computer network to a recipient.

58 Claims, 11 Drawing Sheets

DATA FLOW 300 FOR VERIFYING AN ASSERTION BY A SENDER ABOUT DIGITAL DATA FROM THAT SENDER

THE COMPUTER VOICE STRESS ANALYSIS PROGRAM 310 MAY BE LOCATED AT A COMPUTER OF THE SENDER 110, A COMPUTER OF THE RECIPIENT 120, OR AT THE INTERMEDIARY COMPUTER SERVER 160.

THE CERTIFICATION STATEMENT 150 INCLUDES AT LEAST ONE EXPLICIT OR IMPLICIT ASSERTION OF FACT CONCERNING THE DIGITAL DATA 140.

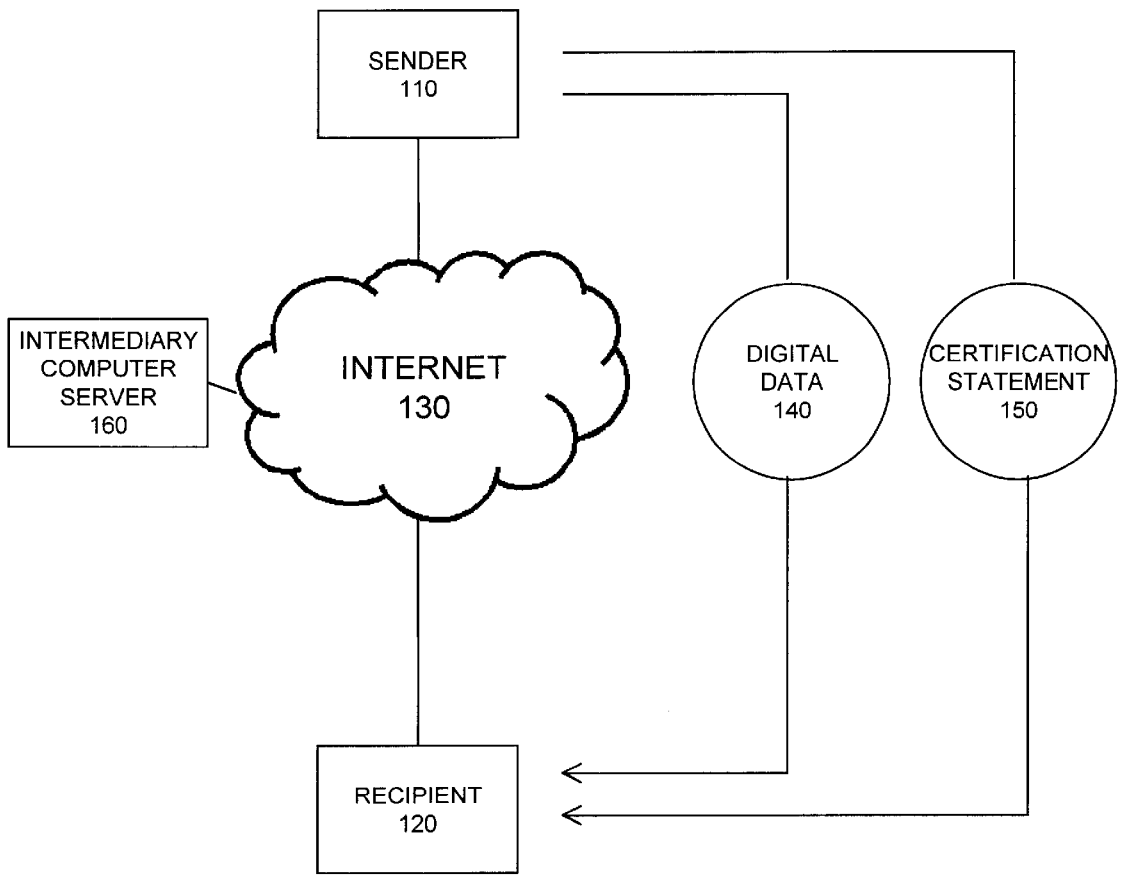

ILLUSTRATION 200 OF A TYPICAL USE OF A CERTIFICATION STATEMENT IN ACCORDANCE WITH AN EXEMPLARY EMBODIMENT OF THE PRESENT INVENTION

THE SENDER 110 INPUTS INTO HIS COMPUTER AN ORAL CERTIFICATION STATEMENT 150 THAT INCLUDES AT LEAST ONE EXPLICIT OR IMPLICIT ASSERTION OF FACT ABOUT THE DIGITAL DATA 140.

FOR EXAMPLE, THE CERTIFICATION STATEMENT 150 MAY COMPRISE AN ORAL STATEMENT BY THE SENDER 110 THAT THE SENDER BELIEVES THE TEXT MESSAGE 140 TO BE TRUTHFUL.

A COMPUTER VOICE STRESS ANALYSIS PROGRAM ANALYZES THE VERACITY OF THE CERTIFICATION STATEMENT 150 AND PROVIDES THE ANALYSIS RESULTS TO THE RECIPIENT 120.

THE RECIPIENT 120 MAY ALSO RECEIVE THE CERTIFICATION STATEMENT 150 SO THAT THE RECIPIENT CAN LISTEN TO THE CERTIFICATION STATEMENT TO DETERMINE THE APPLICABILITY OF THE CERTIFICATION STATEMENT TO THE DIGITAL DATA 140 (I.E., THE EXPLICIT OR IMPLICIT ASSERTION OF FACT).

FIG. 2

METHOD AND SYSTEM FOR TRUTH-ENABLING INTERNET COMMUNICATIONS VIA COMPUTER VOICE STRESS ANALYSIS

FIELD OF THE INVENTION

The invention relates generally to lie detection, and more particularly relates to truth-enabling Internet communications.

BACKGROUND OF THE INVENTION

Text messages are ubiquitous on the Internet. For example, users of the Internet send billions of e-mail messages every day. Over the Web, people can also send text messages that are not included in e-mails. Text messages that people may transmit over the Web include text messages posted on message boards, text messages transmitted between users of online dating services, and online auction ads.

There has heretofore been no convenient and reliable way for a recipient to determine if a sender's text message is truthful. Because the sender of a text message is not orally presenting the information included in the text message in person, the recipient has no opportunity to observe the sender's demeanor while making certain representations or to easily question the sender about the representations the sender has made. This problem is particularly acute where a recipient must rely on representations in a text message made by a sender that the recipient does not personally know—a situation that arises frequently on the Internet.

For obvious reasons, enabling a recipient of a text message to determine the veracity of that text message is desirable. Therefore, there is a need in the art for enabling a text message recipient to determine the truthfulness of a received text message. More generally, there is a need in the art for truth-enabling Internet communications.

SUMMARY OF THE INVENTION

The present invention meets the needs described above in methods for truth-enabling communications over a computer network using computer voice stress analysis. In a typical embodiment, a sender sends a text message over a computer network to a recipient and creates speech input indicating the truthfulness of the text message. A computer voice stress analysis program analyzes the speech input and advantageously informs the recipient of the truthfulness of the text message.

By applying computer voice stress analysis to speech input in order to determine the truthfulness of the text message, the present invention provides the advantage of requiring minimal additional effort on the behalf of either the sender or the recipient to truth-enable the text message. Furthermore, the present invention also provides the advantage of being operable using standard computer equipment which users of a computer linked to a computer network typically have. Though the sender must have a microphone or other audio input peripheral in order to create the speech input indicating the truthfulness of the text message, microphones are becoming increasingly common in personal computer configurations.

Generally, computer voice stress analysis is a process for determining the truthfulness of speech input that includes assessing aspects of the speech input which may be undetectable to the human ear. When a speaker lies, for example, the speaker typically experiences emotional and physical stress. This stress often manifests itself in aspects of the speech input, such as microtremors in portions of the speech input corresponding to the lie. Though people typically cannot hear these microtremors, a computer voice stress analysis program may nonetheless discover them. Searching for such microtremors helps the computer voice stress analysis program to assess the likelihood that the speaker is lying. The computer voice stress analysis program may also examine other indicators of stress and deception in the speech input to help assess the likelihood that the speaker is lying.

In one embodiment of the present invention, a sender creates digital data, such as a text message, at a first computer of the computer network. At some point, the first computer transmits the text message over the computer network to a recipient, who may be an individual at a second computer of the computer network. The first computer may transmit the text message directly to the recipient.

Alternatively, the first computer may send the text message via an intermediary computer server which offers additional functionality corresponding to the nature of the text message. Such an intermediary computer server may comprise an e-mail application service provider (the text message is included in an e-mail addressed to the recipient), a message board (the text message comprises a message to be posted on the message board and which may be read by a recipient that the sender does not personally know), an online auction site (the text message comprises an ad for an item the sender wants to sell through the online auction site, and the recipient is a potential bidder on the item), a site which introduces singles to each other and allows them to exchange text messages, or any other computer server site through which a sender may send a text message. To transmit the text message via an intermediary computer server, the sender's computer first sends the text message to the intermediary computer server, and the intermediary computer server subsequently sends the text message to the recipient's computer for review by the recipient.

In addition to creating the text message, the sender also enters into the first computer speech input which indicates the veracity of the text message. For example, the speech input may indicate the veracity of the text message through an explicit assertion that the sender believes the text message to be truthful. Speech input comprising a vocalization by the sender of a portion of the text message also indicates the veracity of the text message because computer voice stress analysis can later determine if the vocalized portion of the text message is truthful. Speech input comprising such a vocalization of the text message therefore implicitly asserts that the vocalized portion of the text message is truthful.

By applying computer voice stress analysis to the speech input, a computer voice stress analysis program determines the veracity of the text message. The computer voice stress analysis program may be located at the sender's computer, at the recipient's computer, or at an intermediary computer server. The computer voice stress analysis program may next provide the speech input and an indication of the veracity of the speech input to the recipient. The recipient can then listen to the speech input to determine the applicability of the speech input to the text message. The recipient can thereby assess the truthfulness of the text message.

Once the computer voice stress analysis program has determined the veracity of the text message, a computer having this information need not provide an indication of the veracity of the text message to the recipient. Instead, a computer knowing the truthfulness of the text message may forward the text message to the recipient only if the text message is truthful.

Various embodiments of the present invention use speech recognition to verify the content of the speech input. Specifically, well known speech recognition techniques can determine the words intended by the speech input or verify that the words corresponding to the speech input match words the computer expects the sender to vocalize. The speech recognition program may then inform the recipient about whether or not the content of the speech input matches an expected content so that the recipient need not listen to the speech input to determine the applicability of the speech input to the text message.

Generally described, the present invention comprises a method for truth-enabling communications over a computer network. A computer network receives digital data from a sender at a first computer of the computer network. The computer network also receives from the sender an oral certification statement including at least one assertion of fact concerning the digital data. A computer voice stress analysis program determines the veracity of the certification statement using computer voice stress analysis. The computer network then transmits the digital data to a recipient.

The computer network may also indicate to the recipient the veracity of the certification statement. Furthermore, the computer network may also provide the certification statement to the recipient so that the recipient can listen to the certification statement in order to determine an applicability of the certification statement to the digital data (i.e., the assertion of fact concerning the digital data). Instead of providing the certification statement to the recipient, the content of the certification statement may be verified through speech recognition.

The digital data may be a text message. The assertion of fact concerning the digital data may be an explicit assertion of fact concerning the digital data. For example, the assertion of fact may be an explicit assertion that the text message is truthful. If the digital data comprises a text message, the oral certification statement may alternatively comprise a vocalization by the sender of a portion of the text message, thereby causing the assertion of fact concerning the digital data to comprise an implicit assertion that the portion of the text message is truthful.

The digital data may instead comprise a file having copyrightable content and the assertion of fact concerning the digital data may comprise an assertion that the file is not being transferred in violation of copyright laws. An example of a file having copyrightable content is an mp3 file.

The recipient may be a second computer of the computer network. Alternatively, the recipient may be an individual at a second computer of the computer network. The computer network may be the Internet.

The computer voice stress analysis program may determine the veracity of the certification statement at an intermediary computer server. The computer voice stress analysis program may alternatively operate at the first computer of the computer network or at a computer of the recipient.

The certification statement may have numerous sentences. Accordingly, determining the veracity of the certification statement using computer voice stress analysis may be accomplished by determining a likelihood of truthfulness of a portion of the certification statement using computer voice stress analysis. The likelihood of truthfulness of the portion of the certification statement may also be combined with the likelihood of truthfulness of other portions of the certification statement in order to determine the veracity of the certification statement overall.

In another embodiment of the present invention for truth-enabling communications over a computer network, the computer network receives a text message from a sender at a first computer of the computer network. The computer network also receives from the sender speech input indicating a veracity of the text message. A program such as a computer voice stress analysis program then determines the veracity of the text message from the speech input, and the computer network transmits the text message to a recipient. The computer network may also provide the speech input to the recipient so that the recipient can listen to the speech input in order to determine an applicability of the speech input to the text message.

To transmit the text message to the recipient, the computer network may first transmit the text message from the first computer to an intermediary computer server. The intermediary computer server may then make the text message remotely accessible by the recipient.

Yet another embodiment of the present invention also involves truth-enabling communications over a computer network. The computer network receives from a creator of a text message located at a first computer of the computer network speech input indicating a veracity of the text message. A computer voice stress analysis program determines the veracity of the text message from the speech input. The computer network then indicates the veracity of the text message to a recipient of the text message at a second computer of the computer network. The text message may have a link to a Web site through which the veracity of the text message is indicated to the recipient. To determine the veracity of the text message from the speech input, a computer voice stress analysis program may be used.

Before or while indicating the veracity of the text message to the recipient, the computer network may display an ad to the recipient. The ad may be selected based upon the content of the text message.

The speech input may comprise a vocalization of the text message by the creator. In this case, the computer network may also compare the speech input with the text message using speech recognition and indicate to the recipient whether or not the speech input corresponds to the text message. Alternatively, the computer network may provide the speech input to the recipient so that the recipient can listen to the speech input in order to determine an applicability of the speech input to the text message.

The present invention also includes a method for truth-enabling an online auction. The computer network receives from a creator of an online auction advertisement speech input indicating a veracity of the advertisement. The speech input may be received at a first computer server that is separate from a second computer server running the online auction. The computer network then determines the veracity of the advertisement by applying computer voice stress analysis to the speech input. The computer network then indicates the veracity of the advertisement to a bidder on an item corresponding to the advertisement.

Another embodiment of the present invention uses speech recognition. A first computer of the computer network receives speech input from a sender. A speech recognition program then creates a text message corresponding to the speech input. A computer voice stress analysis program determines the veracity of the text message. The computer network then provides the text message to a recipient at a second computer of the computer network and indicates to the recipient the veracity of the text message.

In another embodiment of the present invention using speech recognition, a first computer of the computer network receives a text message from a sender. The first computer also receives speech input from the sender. A speech recognition program then verifies that the speech input comprises a vocalization of the text message. A computer voice stress analysis program determines a veracity of the text message by applying computer voice stress analysis to the speech input. The computer network then transmits the text message to a recipient at a second computer of the computer network.

In yet another embodiment of the present invention using speech recognition, the computer network provides a sender at a first computer of the computer network with a predetermined statement including at least one assertion of fact concerning digital data of the sender. The computer network receives the digital data and speech input from the sender. A speech recognition program then verifies that the speech input comprises a vocalization of the predetermined statement. A computer voice stress analysis program determines a veracity of the assertion of fact by applying computer voice stress analysis to the speech input. The computer network transmits the digital data to a recipient.

In this embodiment, the recipient may comprise a Web server, and the digital data may comprise information supplied by the sender in a Web page form provided by the Web server. Furthermore, the assertion of fact may comprise an assertion that the information supplied by the sender is truthful.

The present invention also includes a method for restricting access to data stored on a computer network. The computer network receives an indication from a user of the computer network that the user wants to access the data. The computer network then provides the user with a predetermined statement. A speech recognition program receives speech input from the user and determines if the speech input comprises the predetermined statement. A computer voice stress analysis program determines if the speech input is truthful. If the speech input comprises the predetermined statement and the speech input is truthful, then the computer network allows the user to access the data.

The various aspects of the present invention may be more clearly understood and appreciated from a review of the following detailed description of the disclosed embodiments and by reference to the appended drawings and claims.

BRIEF DESCRIPTION OF THE DRAWINGS

FIG. 2 is a block diagram illustrating a typical use of a certification statement in accordance with an exemplary embodiment of the present invention.

DETAILED DESCRIPTION OF EXEMPLARY EMBODIMENTS

Figure 1:
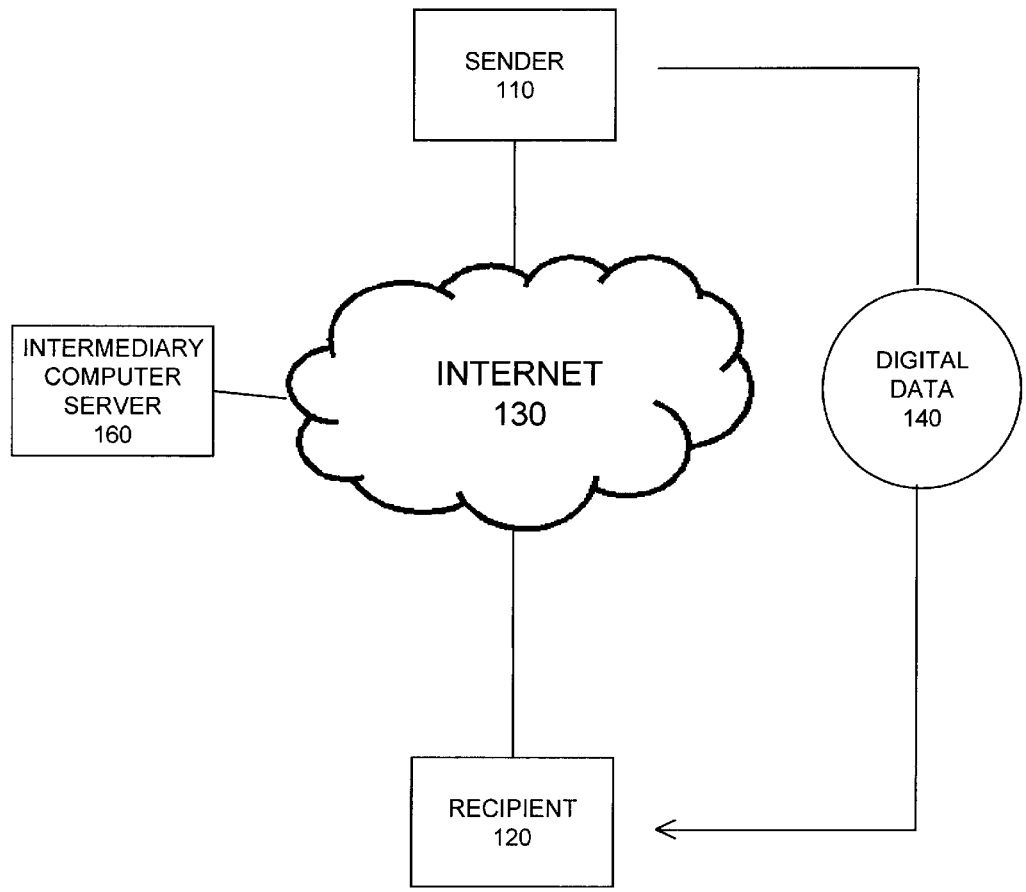
FIG. 1 is a block diagram illustrating a typical scenario in which truth-enabling Internet communications is desirable.

The present invention includes methods for truth-enabling communications over a computer network using computer voice stress analysis. In a typical embodiment, a sender sends a text message over a computer network to a recipient and creates speech input indicating the truthfulness of the text message. A computer voice stress analysis program analyzes the speech input and informs the recipient of the truthfulness of the text message.

Generally, computer voice stress analysis is a process for determining the truthfulness of speech input that includes assessing aspects of the speech input which may be undetectable to the human ear. When a speaker lies, for example, the speaker typically experiences emotional and physical stress. This stress often manifests itself in aspects of the speech input, such as microtremors in portions of the speech input corresponding to the lie. Though people typically cannot hear these microtremors, a computer voice stress analysis program may nonetheless discover them. Searching for such microtremors helps the computer voice stress analysis program to assess the likelihood that the speaker is lying. The computer voice stress analysis program may also examine other indicators of stress and deception in the speech input to help assess the likelihood that the speaker is lying. Techniques for detecting deception in speech input need not be described further because such techniques are well known to those skilled in the art.

In one embodiment of the present invention, a sender creates digital data, such as a text message, at a first computer of the computer network. At some point, the first computer transmits the text message over the computer network to a recipient, who may be an individual at a second computer of the computer network. The first computer may transmit the text message directly to the recipient.

Alternatively, the first computer may send the text message via an intermediary computer server which offers additional functionality corresponding to the nature of the text message. Such an intermediary computer server may comprise an e-mail application service provider (the text message is included in an e-mail addressed to the recipient), a message board (the text message comprises a message to be posted on the message board and which may be read by a recipient that the sender does not personally know), an online auction site (the text message comprises an ad for an item the sender wants to sell through the online auction site, and the recipient is a potential bidder on the item), a site which introduces singles to each other and allows them to exchange text messages, or any other computer server site through which a sender may send a text message. To transmit the text message via an intermediary computer server, the sender's computer first sends the text message to the intermediary computer server, and the intermediary computer server subsequently sends the text message to the recipient's computer for review by the recipient. These embodiments will be more fully described later in the detailed description.

In addition to creating the text message, the sender also enters into the first computer speech input which indicates the veracity of the text message. For example, the speech input may indicate the veracity of the text message through an explicit assertion that the sender believes the text message to be truthful. Speech input comprising a vocalization by the sender of a portion of the text message also indicates the veracity of the text message because computer voice stress analysis can later determine if the vocalized portion of the text message is truthful. Speech input comprising such a vocalization of the text message therefore implicitly asserts that the vocalized portion of the text message is truthful.

By applying computer voice stress analysis to the speech input, a computer voice stress analysis program determines the veracity of the text message. The computer voice stress analysis program may be located at the sender's computer, at the recipient's computer, or at an intermediary computer server. The computer voice stress analysis program may next provide the speech input and an indication of the veracity of the speech input to the recipient. The recipient can then listen to the speech input to determine the applicability of the speech input to the text message. The recipient can thereby assess the truthfulness of the text message.

Once the computer voice stress analysis program has determined the veracity of the text message, a computer having this information need not provide an indication of the veracity of the text message to the recipient. Instead, a computer knowing the truthfulness of the text message may forward the text message to the recipient only if the text message is truthful.

If the sender's computer hosts the computer voice stress analysis program, for example, the sender's computer may refuse to transmit the text message to the recipient if the computer voice stress analysis program determines that the text message is not likely to be true.

If an intermediary computer server assists in the transmission of the text message from the sender to the recipient and the intermediary computer server knows that a computer voice stress analysis program located either at the sender's computer or at the intermediary computer server has determined that the text message is not likely to be true, then the intermediary computer server may refuse to transmit the text message or otherwise make the text message available to the recipient.

Likewise, if the recipient's computer knows that a computer voice stress analysis program located at the recipient's computer or elsewhere has determined that the text message is not likely to be true, then the recipient's computer may not bother to inform the recipient of receipt of the text message. In this manner, the recipient's computer acts to filter out untruthful messages for the recipient.

Various embodiments of the present invention use speech recognition to verify the content of the speech input. Specifically, well known speech recognition techniques can determine the words intended by the speech input or verify that the words corresponding to the speech input match words the computer expects the sender to vocalize. The speech recognition program may then inform the recipient about whether or not the content of the speech input matches an expected content so that the recipient need not listen to the speech input to determine the applicability of the speech input to the text message. Later parts of the detailed description will more fully describe embodiments of the present invention employing speech recognition techniques.

With the help of the figures, in which like numerals refer to like elements throughout the several figures, the detailed description now further describes aspects of the present invention and its applications.

Overview of the Process for Truth-Enabling Internet Communications

FIG. 1 illustrates a typical scenario 100 in which the present invention is applicable. The scenario 100 depicts a sender 110 who is sending digital data 140 over a computer network 130, such as the Internet, to a recipient 120. The sender 110 and the recipient 120 each access the Internet 130 through a computer (not shown) linked to the Internet in a customary way.

Suppose the digital data 140 comprises a text message. The text message 140 could, though need not, comprise an e-mail from the sender 110 to the recipient 120. Without the present invention, the recipient has no reliable way to determine the veracity of that text message 140. However, knowing the veracity of the text message 140 is often desirable for the recipient 120, and the present invention enables the recipient to know the truthfulness of that text message.

Figure 3:
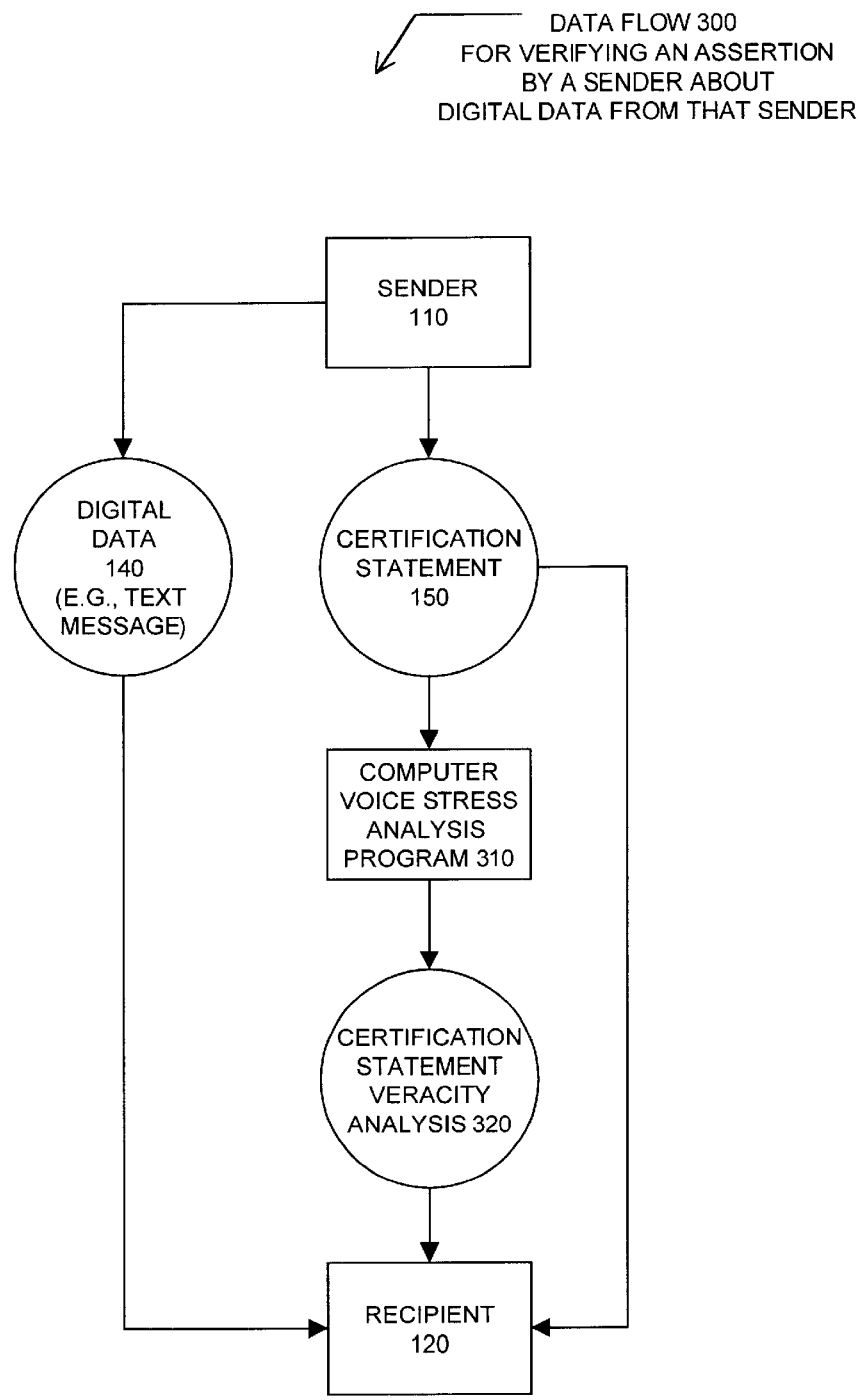
FIG. 3 is a block diagram illustrating the flow of data while verifying an assertion by a sender about digital data from that sender in accordance with an exemplary embodiment of the present invention.

With reference to FIGS. 2 and 3, the detailed description now describes how the present invention accomplishes the goal of enabling the recipient to know the truthfulness of the text message 140. In FIGS. 1, 2, and 3 (as well as in FIGS. 5, 7, and 9, to be discussed later), the circles represent data that is transferred between entities involved in the method of the present invention. The rectangles represent the entities, which may be individuals, computers, or program modules. Each circle is associated with a directional line from the entity sending the data represented by that circle to the entity receiving the data.

As FIGS. 2 and 3 illustrate, the present invention includes applying computer voice stress analysis to an oral certification statement 150 made by the sender 110. If that oral certification statement 150 includes an express assertion that the text message 140 is true, asserts a fact that is also included in the text message, or includes a vocalization of the text message by the sender 110, then determining the veracity of the oral certification statement indicates the veracity of the text message. Providing the recipient 120 with the oral certification statement 150 and an indication 320 of the veracity of the oral certification statement thereby enables the recipient to know the veracity of the text message 140.

More generally, the present invention includes receiving a text message 140 and an oral certification statement 150 from a sender at a first computer connected to the Internet 130. Typically, the sender 110 inputs the certification statement 150 into the sender's computer through a microphone connected to the sender's computer. The certification statement 150 includes at least one explicit or implicit assertion of fact concerning the text message 140.

An example of an explicit assertion of fact about the text message 140 would be where the sender 110 says, "I believe the information included in my text message is true and accurate." Another example of an explicit assertion of fact concerning the text message 140 would be where the sender 110 makes a statement in the certification statement 150 related to a point the sender made in the text message.

The assertion of fact included in the oral certification statement 150 may also be implicit. An implicit assertion of fact occurs whenever the sender 110 vocalizes a portion of the text message 140. For example, suppose the text message 140 includes the following line: "I missed the meeting because my car broke down." In the certification statement 150, the sender 110 vocalizes that portion of the text message 140 by saying, "I missed the meeting because my car broke down." Because the certification statement 150 includes a statement related to a point the sender made in the text message 140 (in this case, in fact, the certification statement and the text message are making the same point), the certification statement includes an explicit assertion of fact concerning the content of the text message 140. However, the certification statement 150 also now includes an implicit assertion of fact concerning the text message 140. Because the sender 110 is offering the certification statement 150 so that a computer voice stress analysis program 310 can determine the truthfulness of the certification statement, the certification statement now implicitly asserts that the portion of the text message 140 corresponding to the certification statement is true.

Still referring to FIGS. 2 and 3, the sender 110 at some point sends the text message 140 to the recipient 120. The sender 110 may also send the certification statement 150 to the recipient 120. A computer voice stress analysis program 310 determines the veracity of the certification statement 150 and provides an indication 320 of the veracity of the certification statement to the recipient 120. The recipient can listen to the certification statement 150 in order to determine the applicability of the certification statement to the text message 140. In other words, the recipient 120 can listen to the certification statement 150 in order to determine the explicit or implicit assertion of fact concerning the text message 140. With this information, the recipient 120 can thereby determine if the text message 140 is truthful.

One skilled in the art should understand that though the detailed description describes the computer voice stress analysis program 310 as determining the truthfulness of the certification statement 150, the computer voice stress analysis program may not be completely accurate. Rather, the computer voice stress analysis program 310 uses various criteria to conclude whether or not the certification statement 150 is likely to be true.

A certification statement 150 may include multiple sentences. To determine the veracity of the certification statement 150, therefore, the computer voice stress analysis program 310 may determine the veracity of individual portions or sentences of the certification statement.

The computer voice stress analysis program 310 may also calculate probabilities that individual portions of the certification statement 150 are true. The computer voice stress analysis program 310 may further combine the probabilities that the individual portions of the certification statement 150 are true to calculate a probability that the certification statement as a whole is true.

When providing an indication 320 of the veracity of the certification statement 150 to a recipient 120, the computer voice stress analysis program 310 may include various types of information in the indication of veracity. For example, the computer voice stress analysis program 310 may indicate to the recipient 120 that the certification statement 150 as a whole is likely true or false. Alternatively, the computer voice stress analysis program 310 may identify which portions of the certification statement 150 the program 310 believes are likely true and which portions of the certification statement the program believes are likely false. The computer voice stress analysis program 310 may even indicate the veracity of the certification statement 150 by providing the recipient 120 with calculated probabilities that the certification statement as a whole or portions thereof are true.

In the embodiment of the present invention described above, the digital data 140 comprises a text message and the certification statement 150 includes at least one explicit or implicit assertion of fact concerning the truthfulness of the text message, the truthfulness of a portion of the text message, or the truthfulness of a point related to a point made in the text message. However, one skilled in the art should understand that the present invention is not so limited. Thus, the digital data 140 need not comprise a text message and the certification statement 150 can comprise an assertion of fact that does not relate to the truthfulness of the digital data's content.

For example, the digital data 140 may comprise a file having copyrightable content and the assertion of fact concerning the digital data could comprise an assertion that the sender is not transferring the file in violation of copyright laws. Examples of files having copyrightable content include both music files (such as an mp3 file or wav file) and picture files (such as a gif file or jpeg file).

As in the text message embodiment, the sender's computer sends the digital data 140 over the Internet 130 to the recipient 120. A computer voice stress analysis program 310 determines the veracity of the certification statement 150 and indicates the veracity of the certification statement to the recipient 120. The recipient 120 may review the certification statement 150 to determine the assertion of fact concerning the digital data 140 that is included in the certification statement.

Even if the digital data 140 comprises a text message, the assertion of fact in the certification statement 150 need not concern the truthfulness of the content of the text message or the truthfulness of a point related to a point made in the text message. For example, the sender 110 may assert in the certification statement 150 that the sender typed the text message 140 with one hand, even though the sender has not made a related point in the text message itself.

Referring to FIGS. 1–3, one skilled in the art should understand that the recipient 120 need not comprise an individual at a computer connected to the Internet 130. Instead, the recipient 120 of the digital data 140 could itself comprise a computer which has a need for the digital data 140. In embodiments of the present invention in which the recipient 120 comprises a computer having a need for the digital data 140, speech recognition technology is typically used to verify the content of the certification statement 150. Such embodiments will be described in more detail later in the detailed description.

The sender 110 need not transmit the digital data 140 directly from the sender's computer over the Internet 130 to the recipient 120. In alternative embodiments, the digital data 140 passes through one or more intermediary computer servers such as the intermediary computer server 160 (FIGS. 1 and 2) en route to the recipient 120. In such embodiments, the sender's computer first sends the digital data 140 over the Internet 130 to the intermediary computer server 160, which later sends the digital data over the Internet to the recipient 120. When the intermediary computer server 160 sends the digital data 140 to the recipient 120 may depend on the nature of the intermediary computer server. Typical embodiments of an intermediary computer server 160 that assists in the transfer of a text message 140 from the sender 110 to the recipient 120 will now be described. In addition to the intermediary computer server 160 embodiments described below, the present invention contemplates other types of intermediary computer servers that assist in the transfer of digital data 140 from a sender 110 to a recipient 120 in an analogous manner.

In one embodiment, the intermediary computer server 160 comprises an application service provider, such as an e-mail application service provider. Generally, an application service provider 160 remotely provides a user with a computer application that the user need not store on the user's computer. Typically, the application service provider 160 does this through the user's Web browser.

Thus, an e-mail application service provider 160 remotely provides the user 110 or 120 with e-mail capabilities and an e-mail account even though the user does not have an e-mail application on the user's computer. Through a Web browser running on the computer of the user 110 or 120, the user can create, send, receive, and review e-mail messages. An e-mail message sent to a recipient 120 who is using the e-mail application service provider 160 is stored at the application service provider 160 until the recipient notifies the e-mail application service provider through a Web browser that the recipient wants to review received e-mail.

One skilled in the art should appreciate that the sender 110 and the recipient 120 need not use the same e-mail application service provider to send e-mail between them. In fact, e-mail communication between the sender 110 and the recipient 120 is feasible even though only one of them or neither of them uses an e-mail application service provider 160. In embodiments of the present invention in which the intermediary computer server 160 comprises an e-mail application service provider that facilitates the transfer of an e-mail from the sender 110 to the recipient 120, the digital data 140 comprises an e-mail.

In another embodiment of the present invention, the intermediary computer server 160 comprises a message board and the digital data 140 comprises a text message created by the sender 110 and posted on that message board. Generally, a message board 160 permits a user 110 to post a text message 140 on a particular topic. Other users of the message board 160 that the poster 110 of the text message 140 may not personally know can then view the posted text message and, if they wish, post further text messages on the same topic. All these users of the message board 160 typically access the message board remotely using a Web browser. Such message boards 160 are well known to those skilled in the art.

The following description illustrates how a message board 160 can assist in the transmission of a text message 140 from the sender 110 to the recipient 120. The sender 110 creates a text message 140 and sends that text message over the Internet 130 to the message board 160 using a Web browser. The message board 160 then makes the text message available for viewing by other users of the message board, including the recipient 120. Typically, the message board 160 does this by listing a subject line for each posted message in order from newest to oldest for a given topic. The recipient 120 then selects a particular message for viewing through a Web browser. Next, the message board 160 displays the text message through the recipient's Web browser on the display of the computer of the recipient 120. The recipient 120 can thereby read the text message 140.

In yet another embodiment of the present invention, the intermediary computer server 160 comprises an online auction site and the text message 140 comprises an ad for an item the sender 110 wishes to sell through the online auction site. Typical online auction sites, which are well known to those skilled in the art, include EBAY and YAHOO! AUCTION. Generally, such an auction site 160 allows a seller 110 to post an ad 140 describing an item for sale to potential bidders. Bidders then place bids on the posted items, and the high bidder wins the auction and the right to buy the item for a price equal to his bid.

The following description illustrates how an online auction site 160 can assist in the transmission of a text message 140 comprising an ad for an auction item from the sender 110 to the recipient 120. The sender 110 creates an ad 140 describing the item the sender wants to sell through the online auction The sender 110 then sends the ad 140 over the Internet 130 to the online auction site 160, which makes the ad available for viewing by potential bidders. The recipient 120, a potential bidder, indicates through a Web browser that the recipient wants to view the ad 140 of the sender 110. The online auction site 160 then displays the ad 140 through the recipient's Web browser on the display of the computer of the recipient 120. The recipient 120 can then read the ad 140 and determine whether or not to bid on the item.

In different embodiments of the present invention, the computer voice stress analysis program 310 may be located at the sender's computer, at the recipient's computer, or at the intermediary computer server 160. These various embodiments are now more fully described. In the following description of these embodiments, it should be appreciated that the intermediary computer server 160 may, though need not, also assist in the transfer of the digital data 140 from the sender 110 to the recipient 120 in a manner already described.

In one embodiment of the present invention, the computer voice stress analysis program 310 is located at the sender's computer. Once the sender 110 enters the certification statement 150 into the sender's computer, the computer voice stress analysis program 310 determines the veracity of the certification statement. The sender's computer then sends an indication 320 of the veracity of the certification statement 150 over the Internet 130 to the recipient 120, possibly via an intermediary computer server 160 that makes the indication of the certification statement's veracity available to the recipient in the same way that the intermediary computer server may make the digital data 140 available to the recipient.

Typically, the sender's computer also sends the certification statement 150 over the Internet 130 to the recipient 120. Again, the transmission of the certification statement 150 may be via an intermediary computer server 160 that makes the certification statement available to the recipient 120 in the same way that the intermediary computer server may make the digital data 140 available to the recipient. The recipient 120 can thereby listen to the certification statement in order to determine the applicability of the certification statement to the digital data 140.

Locating the computer voice stress analysis program 310 at the sender's computer provides additional advantages. Specifically, audio data is typically bandwidth intensive, so a file comprising a certification statement 150 is usually quite large. Once the computer voice stress analysis program 310 has analyzed the certification statement 150, however, the sender's computer can apply a lossy compression algorithm to the certification statement to produce a compressed certification statement. Such a lossy compression algorithm removes data from the file comprising the certification statement 150 that is not needed to audibly reproduce the certification statement with sufficient quality to enable the recipient 120 to understand the content of the certification statement. Typically, this lossy compression algorithm removes data that the computer voice stress analysis program 310 relies upon to determine the veracity of the certification statement 150. Audio lossy compression algorithms are well known to those skilled in the art.

The result of applying the lossy compression algorithm to the certification statement 150 is thus a compressed certification statement that is much smaller than the certification statement 150 but that is still adequate for apprising the recipient 120 of the content of the certification statement. The sender's computer can then transmit the compressed certification statement and the indication 320 of the veracity of the certification statement 150 over the Internet 130 to the recipient 120. The recipient 120 then knows the veracity of the certification statement 150 and can listen to the compressed certification statement to determine the applicability of the certification statement to the digital data 140. This technique reduces the present invention's need for network bandwidth.

In another embodiment of the present invention, the computer voice stress analysis program 310 is located at the computer of the recipient 120. First, the sender 110 enters the certification statement 150 into the sender's computer. Then, the sender's computer transmits the certification statement 150 over the Internet 130 to the computer of the recipient 120. This transmission of the certification statement 150 may be via an intermediary computer server 160 that makes the certification statement available to the recipient 120 in the same way that the intermediary computer server may make the digital data 140 available to the recipient. The computer voice stress analysis program 310 located at the recipient's computer then determines the veracity of the certification statement 150 and provides an indication 320 of the veracity of the certification statement to the recipient 120. Furthermore, the recipient 120 can instruct the recipient's computer to play the certification statement 150 so that the recipient can determine the applicability of the certification statement to the digital data 140.

In yet another embodiment of the present invention, the computer voice stress analysis program 310 is located at an intermediary computer server 160. The computer voice stress analysis program 310 can be located at the intermediary computer server 160 regardless of how the sender 110 transfers the digital data 140 to the recipient 120. Thus, the computer voice stress analysis program 310 can be located at the intermediary computer server 160 even though the intermediary computer server also assists in the transfer of the digital data 140 in a manner already described, the sender 110 transfers the digital data directly to the recipient 120, or the sender transfers the digital data through a second intermediary computer server (not shown) that assists in the transfer of the digital data in a manner already described.

If the computer voice stress analysis program 310 is located at the intermediary computer server 160, then the computer of the sender 110 transmits the certification statement 150 to the intermediary computer server for processing. The computer voice stress analysis program 310 at the intermediary computer server 160 then determines the veracity of the certification statement 150. Subsequently, the intermediary computer server 160 makes available to the recipient 120 an indication 320 of the veracity of the certification statement 150 as well as the certification statement itself. Before transmitting the certification statement 150 and the indication 320 of the veracity of the certification statement to the recipient 120, the intermediary computer server 160 may await an indication from the recipient that the recipient wants to access this information. Upon receipt, the recipient 120 can listen to the certification statement 150 in order to determine the applicability of the certification statement to the digital data 140.

From the foregoing description, one skilled in the art should appreciate that the intermediary computer server 160 may not only assist in making the digital data 140 available to the recipient 120, but also may assist in making the certification statement 150 and/or an indication 320 of the veracity of the certification statement 150 available to the recipient. By consolidating the transfer of relevant information in a single intermediary computer server 160, the present invention may simplify the experience for both the sender 110 and the recipient 120. The intermediary computer server 160 may even host the computer voice stress analysis program 310 so that the server 160 can receive the certification statement 150 from the sender 110; determine the veracity of the certification statement; and make the digital data 140, the certification statement, and an indication 320 of the veracity of the certification statement available to the recipient 120.

Server for Offering Truth-Enablement as a Value-Added Service

On the other hand, one skilled in the art should also appreciate from the foregoing description that the intermediary computer server 160 could assist in making the certification statement 150 and/or an indication 320 of the veracity of the certification statement 150 available to the recipient without assisting in transferring the digital data 140 from the sender 110 to the recipient 120. In this scenario, either the sender 110 directly transfers the digital data 140 to the recipient 120 or a second intermediary computer server (not shown) assists in the transfer of the digital data in a manner already described.

In this embodiment of the present invention, the intermediary computer server 160 may charge a fee for this value-added service. This fee may be a per transaction fee or a subscription fee. If the second intermediary computer server assists in the transfer of the digital data 140, then the intermediary computer server 160 could be run by an entity unrelated to the entity running the second intermediary computer server.

In an exemplary implementation in which the intermediary computer server 160 embodies this value-added service, the sender 110 includes a Web page link with or in the digital data 140. Furthermore, the sender 110 transmits the certification statement 150 to the intermediary computer server 160. Then, a computer voice stress analysis program 310 at the intermediary computer server 160 determines the veracity of the certification statement.

Upon receiving the digital data 140 either directly from the sender 110 or through the second intermediary computer server, the recipient 120 follows the link to a Web page of the intermediary computer server 160. Through this Web page, the recipient 120 can access the certification statement 150 and an indication 320 of the veracity of the certification statement.

If the digital data 140 comprises a text message and the certification statement 150 comprises a vocalization of the text message by the sender 110, then the value-added service embodied in the intermediary computer server 160 could provide the recipient 120 with an indication 710 (FIG. 7) of whether or not the certification statement 150 corresponds to the text message 140. By doing so, the value-added service eliminates the need to supply the certification statement 150 itself to the recipient 120 because the recipient will no longer need to listen to the certification statement to determine the applicability of the certification statement to the text message 140.

In this embodiment, the sender 110 may include a link to a Web page of the intermediary computer server 160 in the text message 140. In response to the recipient 120 choosing this link, the link sends a copy of the text message 140 to the intermediary computer server 160. The link also transfers the recipient 120 to the Web page of the intermediary computer server 160. Through this Web page, the recipient 120 can obtain the indication 710 of whether or not the certification statement 150 corresponds to the text message 140 and the indication 320 of the veracity of the certification statement 150. To determine the indication 710 to provide to the recipient 120, the intermediary computer server 160 compares the certification statement 150 with the text message 140 using speech recognition techniques.

If the value-added service is offered through the intermediary computer server 160 and the digital data 140 is sent through a second intermediary computer server, then the second intermediary computer server can provide the recipient 120 with the link to the Web page at the intermediary computer server 160 through which the recipient can access the indication 320 of the veracity of the certification statement.

In the embodiments of the present invention in which the intermediary computer server 160 embodies a value-added truth-enablement service, the intermediary computer server may earn additional revenue by displaying an ad, such as a banner ad, to the recipient 120 prior to or while providing the recipient with the indication 320 of the veracity of the certification statement 150. Preferably, the intermediary computer server 160 selects this ad based upon the content of the text message 140. For example, the intermediary computer sever 160 could perform a keyword search on the text message 140 in order to select an ad targeting the recipient 120. Alternatively, the ad could be targeted to the recipient 120 based upon the nature of the text message 140 or the nature of the service offered by the second intermediary computer server from which the recipient has been transferred.

Computer Network for Truth-Enabling Internet Communications

FIGS. 1 and 2 also illustrate an exemplary computer network architecture for sending truth-enabled Internet communications. The sender 110 and the recipient 120 may be computers connected to the Internet 130. Alternatively, the sender 110 and the recipient 120 may be individuals using computers connected to the Internet 130 to communicate over the Internet. As already described, an intermediary computer server 160 may also participate in the process of sending truth-enabled Internet communications.

Each computer node (such as computers 110, 120, and 160) of the computer network for sending truth-enabled Internet communications may have typical features of a computer system, such as a processing unit, a system memory containing random access memory (RAM) and read only memory (ROM), and a system bus that couples the system memory to the processing unit. The computer may also include various memory storage devices, such as a hard disk drive, a magnetic disk drive (e.g., to read from or write to a removable magnetic disk), and an optical disk drive (e.g., to read from or write to optical media such as a CD-ROM or DVD).

A number of program modules may be stored in the drives and RAM of the computer system. Program modules control how the computer system functions and interacts with the user, with input/output devices, or with other computers. Program modules include routines, an operating system, application program modules, data structures, browsers, and other software or firmware components. The invention may conveniently be implemented in various program modules, such as the computer voice stress analysis program 310, that are stored on the computers of the network and implement the methods described in the detailed description.

No particular programming language will be described for carrying out the various procedures described in the detailed description because it is considered that the operations, steps, and procedures described and illustrated in the accompanying drawings are sufficiently disclosed to permit one of ordinary skill in the art to practice an exemplary embodiment of the present invention. Moreover, there are many computers and operating systems which may be used in practicing an exemplary embodiment, and therefore no detailed computer program could be provided which would be applicable to all of these many different systems. Each user of a particular computer will be aware of the language and tools which are most useful for that user's needs and purposes.

In FIGS. 1 and 2, the lines connecting the various nodes of the computer network to the Internet 130 represent network connections. The computer may connect to the Internet 130 in the customary way, such as through a computer modem or using a network interface card. Although FIGS. 1 and 2 illustrate an implementation of the present invention on the Internet 130, one may also practice the present invention in other types of wide area networks and in local area networks. When a first entity is described as remote to a second entity, the first entity and the second entity are linked by a network communication connection.

Verifying an Assertion by a Sender about Digital Data from that Sender

Figure 4:
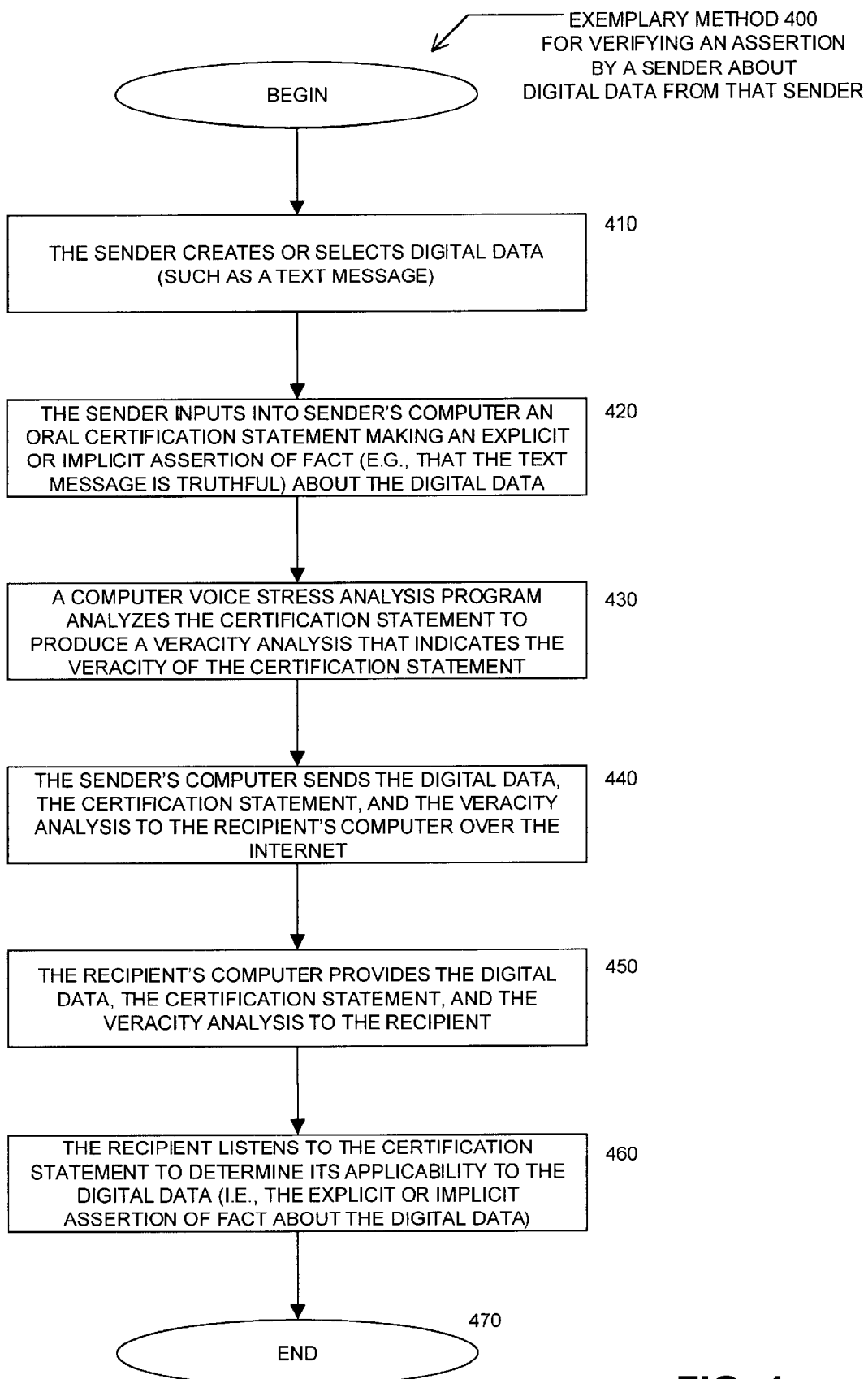
FIG. 4 is a logical flow diagram for verifying an assertion by a sender about digital data from that sender in accordance with an exemplary embodiment of the present invention.

FIG. 4 is a logical flow diagram illustrating the steps in an exemplary method 400 for verification of an assertion by the sender 110 about digital data 140 from that sender. FIG. 3 is a block diagram illustrating the flow of data 300 between the entities 110, 120, and 310 involved in the exemplary method 400.

While the exemplary method 400 describes an embodiment of the invention in which the computer voice stress analysis program 310 is located at the sender's computer, the data flow diagram 300 of FIG. 3 does not indicate where the computer voice stress analysis program 310 is located, and the present invention is not limited to placing the computer voice stress analysis program at the sender's computer. Therefore, the data flow diagram 300 of FIG. 3 provides a more general embodiment of the present invention than does FIG. 4 because the computer voice stress analysis program 310 may be located at the sender's computer, at the recipient's computer, or at the intermediary computer server 160. With reference to FIGS. 3 and 4, the detailed description now describes the steps of the exemplary method 400 for verification of an assertion by the sender 110 about digital data 140 from that sender.

Exemplary method 400 begins with step 410. In step 410, the sender 110 creates or selects digital data 140, such as a text message.

In step 420, the sender 110 inputs into the sender's computer an oral certification statement 150 making an explicit or implicit assertion of fact concerning the digital data 140. For example, the explicit assertion of fact may be a statement by the sender 110 that the text message 140 is truthful.

In step 430, a computer voice stress analysis program 310 analyzes the certification statement 150 to produce a veracity analysis 320 that indicates the veracity of the certification statement. In step 440, the sender's computer sends the digital data 140, the certification statement 150, and the veracity analysis 320 to the recipient's computer by sending them over the Internet 130.

In step 450, the recipient's computer provides the digital data 140, the certification statement 150, and the veracity analysis 320 to the recipient 120. In step 460, the recipient 120 then listens to the certification statement 150 to determine its applicability to the digital data 140. In other words, the recipient 120 listens to the certification statement 150 in order to determine the explicit or implicit assertion of fact that the sender 110 has made concerning the digital data 140. The method 400 ends in step 470.

Figure 5:
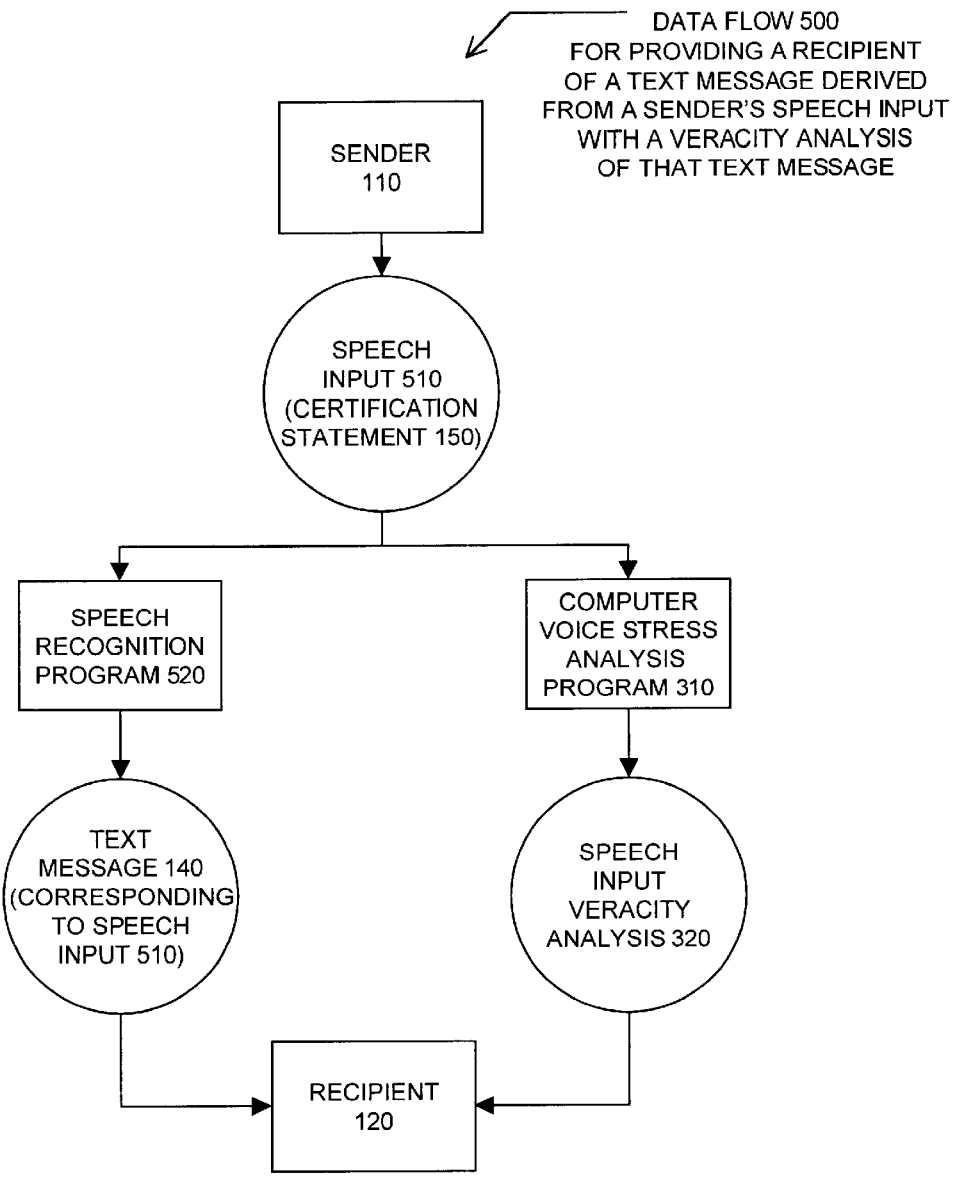
FIG. 5 is a block diagram illustrating the flow of data while providing a recipient of a text message derived from a sender's speech input with a veracity analysis of that text message in accordance with an exemplary embodiment of the present invention.
Figure 6:
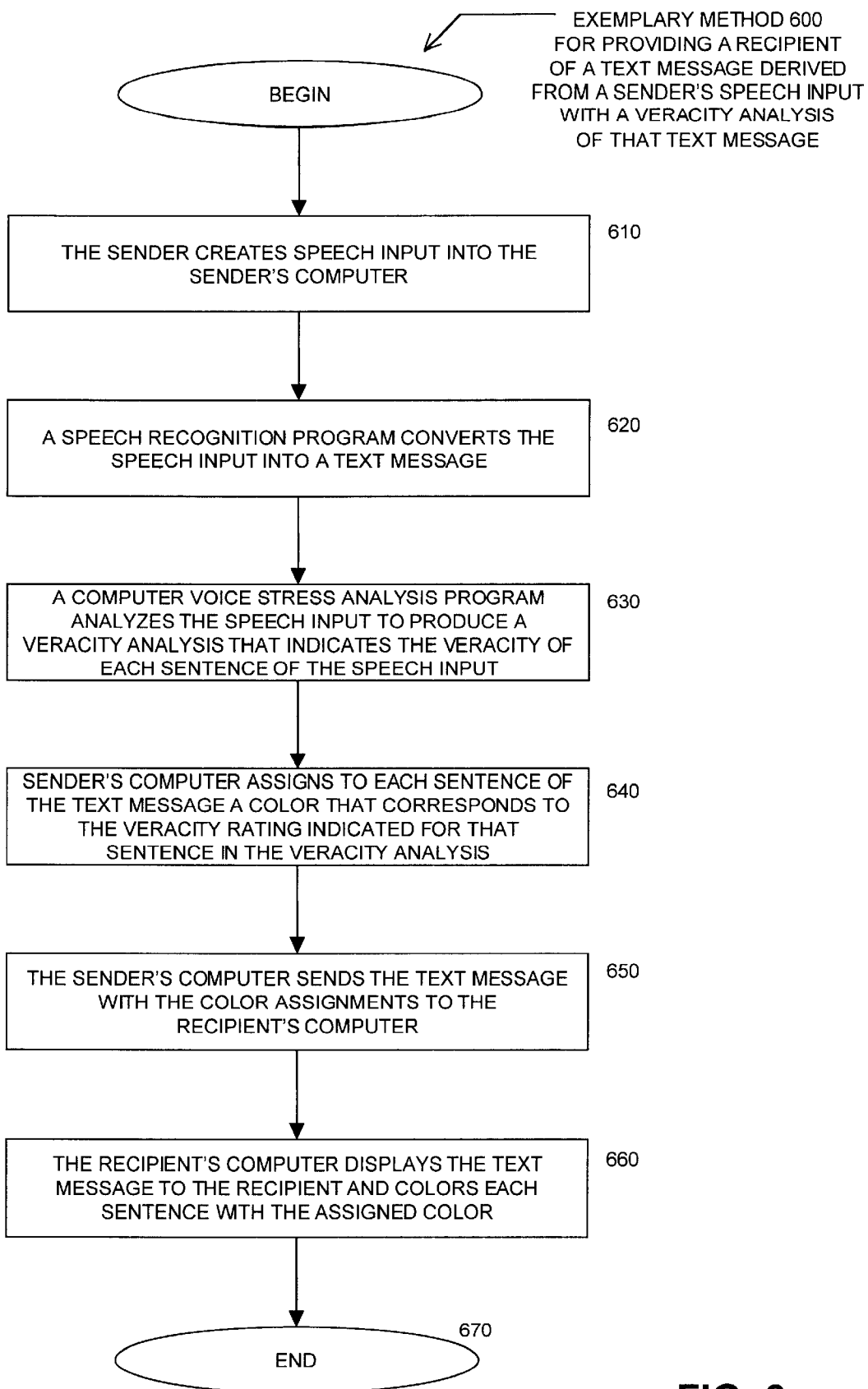
FIG. 6 is a logical flow diagram for providing a recipient of a text message derived from a sender's speech input with a veracity analysis of that text message in accordance with an exemplary embodiment of the present invention.

Providing a Recipient of a Text Message Derived from a Sender's Speech Input with an Indication of the Veracity of that Text Message FIG. 6 is a logical flow diagram illustrating the steps in an exemplary method 600 for providing a recipient 120 of a text message 140 derived from a sender's speech input 510 with an indication 320 of the veracity of that text message. FIG. 5 is a block diagram illustrating the flow of data 500 between the entities 110, 120, 520, and 310 involved in the exemplary method 600. With reference to FIGS. 5 and 6, the detailed description now describes the steps of the exemplary method 600, which begins in step 610.

In step 610, the sender 110 creates speech input 510 and enters that speech input into the sender's computer. In step 620, a speech recognition program 520 converts the speech input 510 into a text message 140 corresponding to the speech input.

In step 630, a computer voice stress analysis program 310 analyzes the speech input 510 to produce a veracity analysis 320 that indicates the veracity of each sentence (or part thereof) of the speech input. In step 640, the sender's computer assigns to each sentence of the text message 140 a color that corresponds to the veracity indication for that sentence in the veracity analysis 320. The veracity indication for a sentence may label the sentence as either true or untrue, or the veracity indication for a sentence may indicate a probability of truthfulness for the sentence. The veracity indication could even indicate that the probability of truthfulness for the sentence falls within one of several different probability ranges.

In step 650, the sender's computer sends the text message 140 with the color assignments to the recipient's computer. In step 660, the recipient's computer displays the text message 140 to the recipient 120 and colors each sentence (or part thereof) with the assigned color. The method ends in step 670.

Though the data flow diagram 500 of FIG. 5 corresponds to the logical flow diagram 600 of FIG. 6, the data flow diagram 500 of FIG. 5 presents a more general embodiment of the present invention than does FIG. 6. Specifically, FIG. 5 does not specify the location of the speech recognition program module 520 and the computer voice stress analysis program module 310. These program modules 520 and 310 may each be located at the sender's computer, at the recipient's computer, or at an intermediary computer server 160.

Furthermore, the data flow diagram 500 of FIG. 5 does not specify the format in which the veracity analysis 320 indicating the veracity of the speech input 510 is provided to the recipient 120. The recipient's computer need not use color coding of sentences of the text message 140 to indicate the veracity of the speech input 510 to the recipient 120. Instead, the recipient's computer may provide the recipient 120 with an overall veracity rating for the speech input 510, or the recipient's computer may provide the recipient with a veracity rating for one or more sentences of the speech input.

Figure 7:
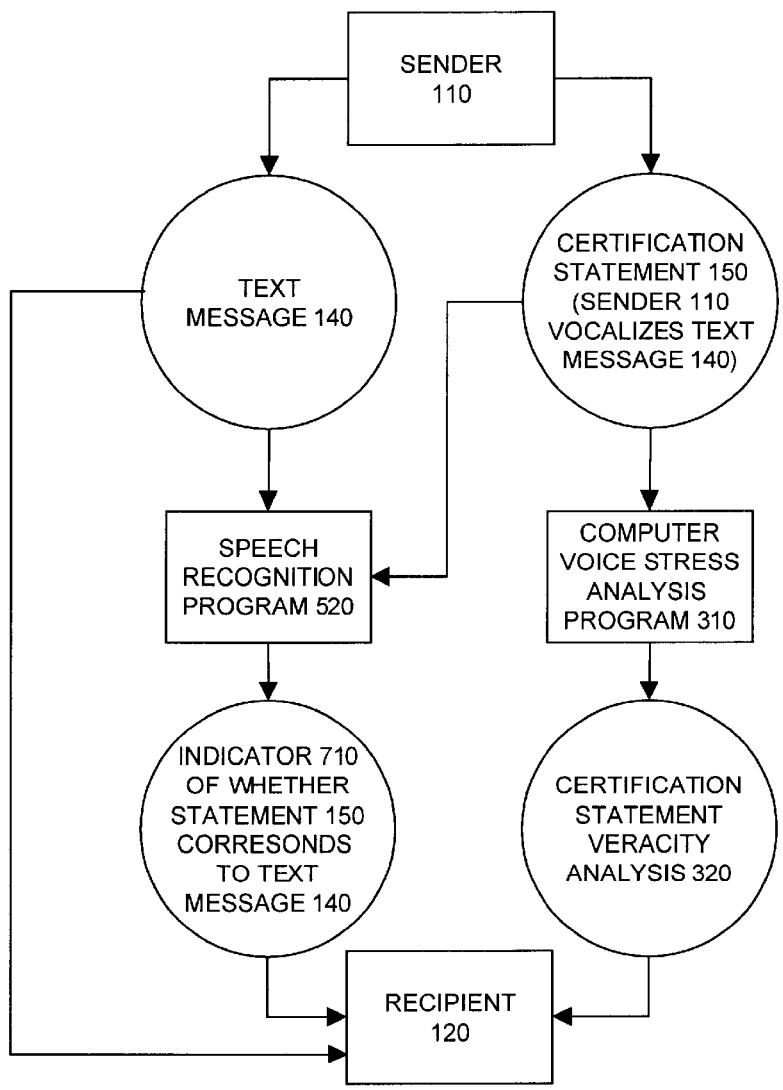
FIG. 7 is a block diagram illustrating the flow of data while providing a recipient with a text message whose veracity is verified by analysis of the sender's vocalization of that text message in accordance with an exemplary embodiment of the present invention.
Figure 8:
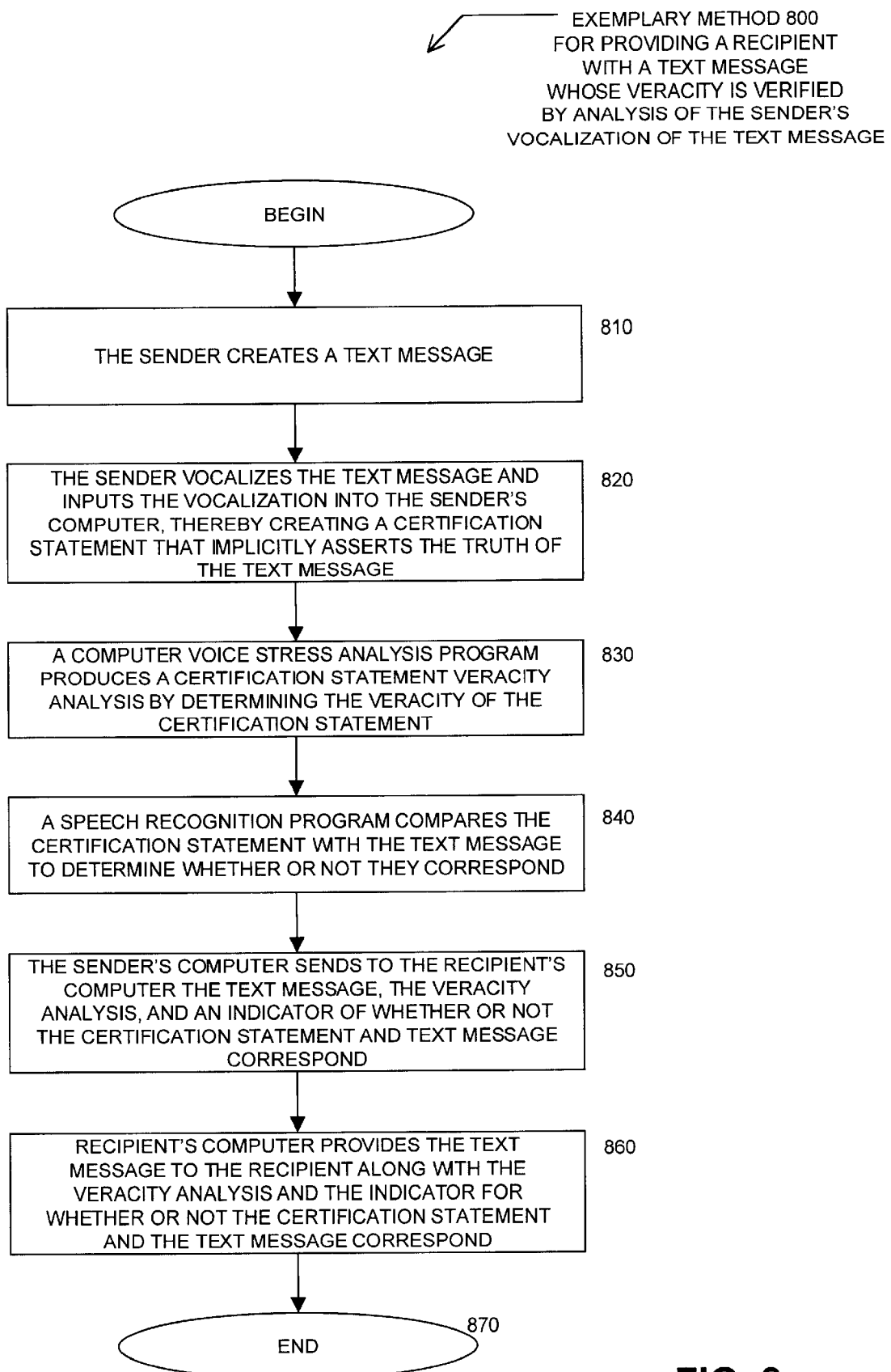
FIG. 8 is a logical flow diagram for providing a recipient with a text message whose veracity is verified by analysis of the sender's vocalization of that text message in accordance with an exemplary embodiment of the present invention.

Providing a Recipient with a Text Message Whose Veracity is Verified by Analysis of the Sender's Vocalization of the Text Message FIG. 8 is a logical flow diagram illustrating the steps in an exemplary method 800 for providing a recipient 120 with a text message 140 whose veracity is verified by analysis of a vocalization 150 by the sender 110 of the sender's text message. FIG. 7 is a block diagram illustrating the flow of data 700 between the entities 110, 120, 520, and 310 involved in the exemplary method 800. With reference to FIGS. 7 and 8, the detailed description now describes the steps of the exemplary method 800, which begins in step 810.

In step 810, the sender 110 creates a text message 140. In step 820, the sender 110 vocalizes the text message 140 and inputs the vocalization 150 into the sender's computer, thereby creating a certification statement 150 that implicitly asserts the truth of the text message.

In step 830, a computer voice stress analysis program 310 determines the veracity of the certification statement 150 and produces a certification statement veracity analysis 320 indicating the veracity of the certification statement. In step 840, a speech recognition program 520 compares the certification statement 150 with the text message 140 to determine whether or not they correspond.

In step 850, the sender's computer sends to the recipient's computer the text message 140, the indication 320 of the veracity of the certification statement 150, and an indicator 710 of whether or not the certification statement and the text message correspond. In step 860, the recipient's computer provides the text message 140 to the recipient 120 along with the indication 320 of the veracity of the certification statement 150 and the indicator 710 of whether or not the certification statement and the text message correspond. The method then ends in step 870.

Though the data flow diagram 700 of FIG. 7 corresponds to the logical flow diagram 800 of FIG. 8, the data flow diagram 700 of FIG. 7 presents a more general embodiment of the present invention than does FIG. 8. For example, FIG. 7 does not specify the location of the speech recognition program module 520 and the computer voice stress analysis program module 310. These program modules 520 and 310 may each be located at the sender's computer, at the recipient's computer, or at an intermediary computer server 160.

Figure 9:
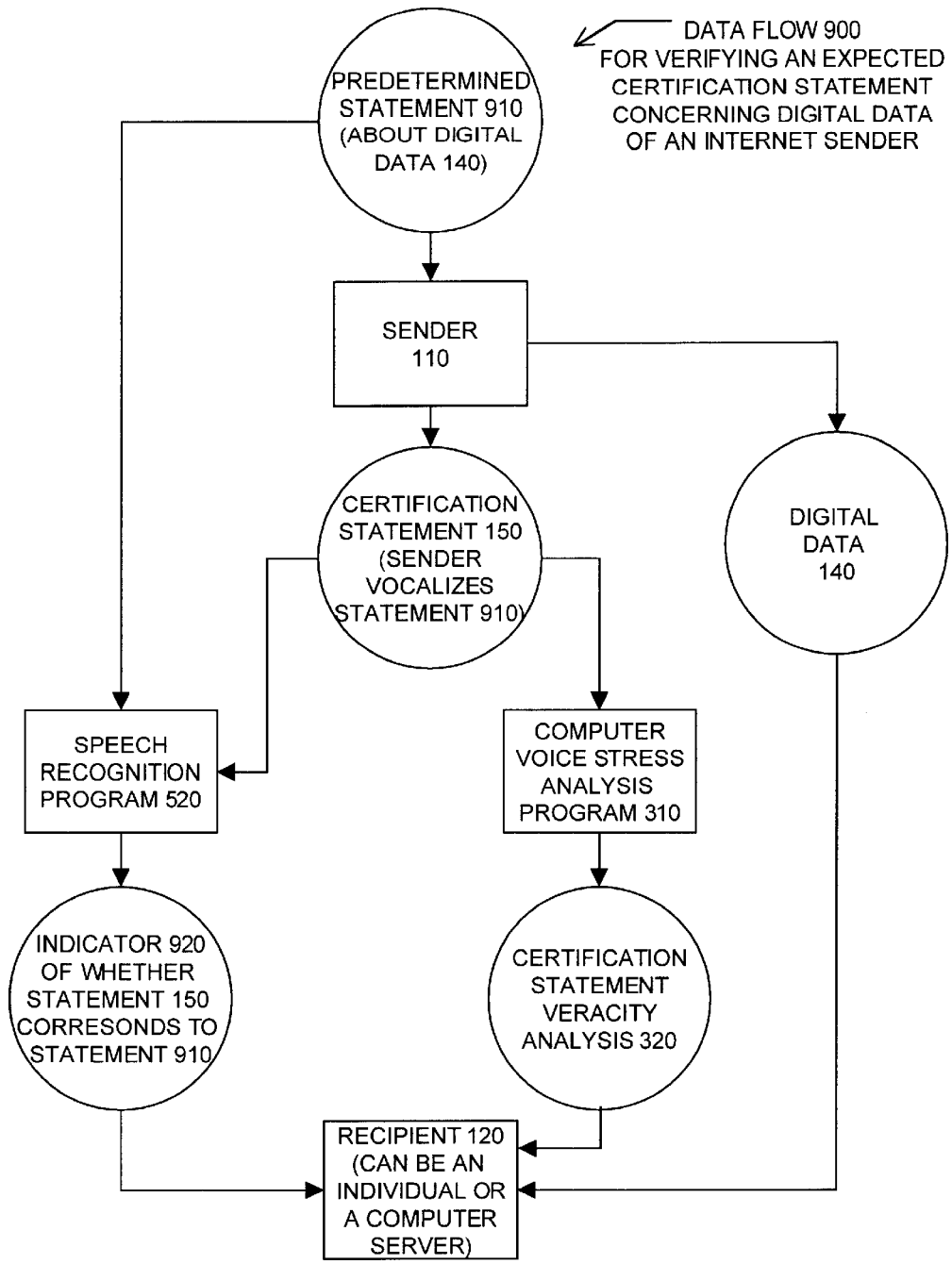
FIG. 9 is a block diagram illustrating the flow of data while verifying an expected certification statement concerning digital data of an Internet sender in accordance with an exemplary embodiment of the present invention.
Figure 10:
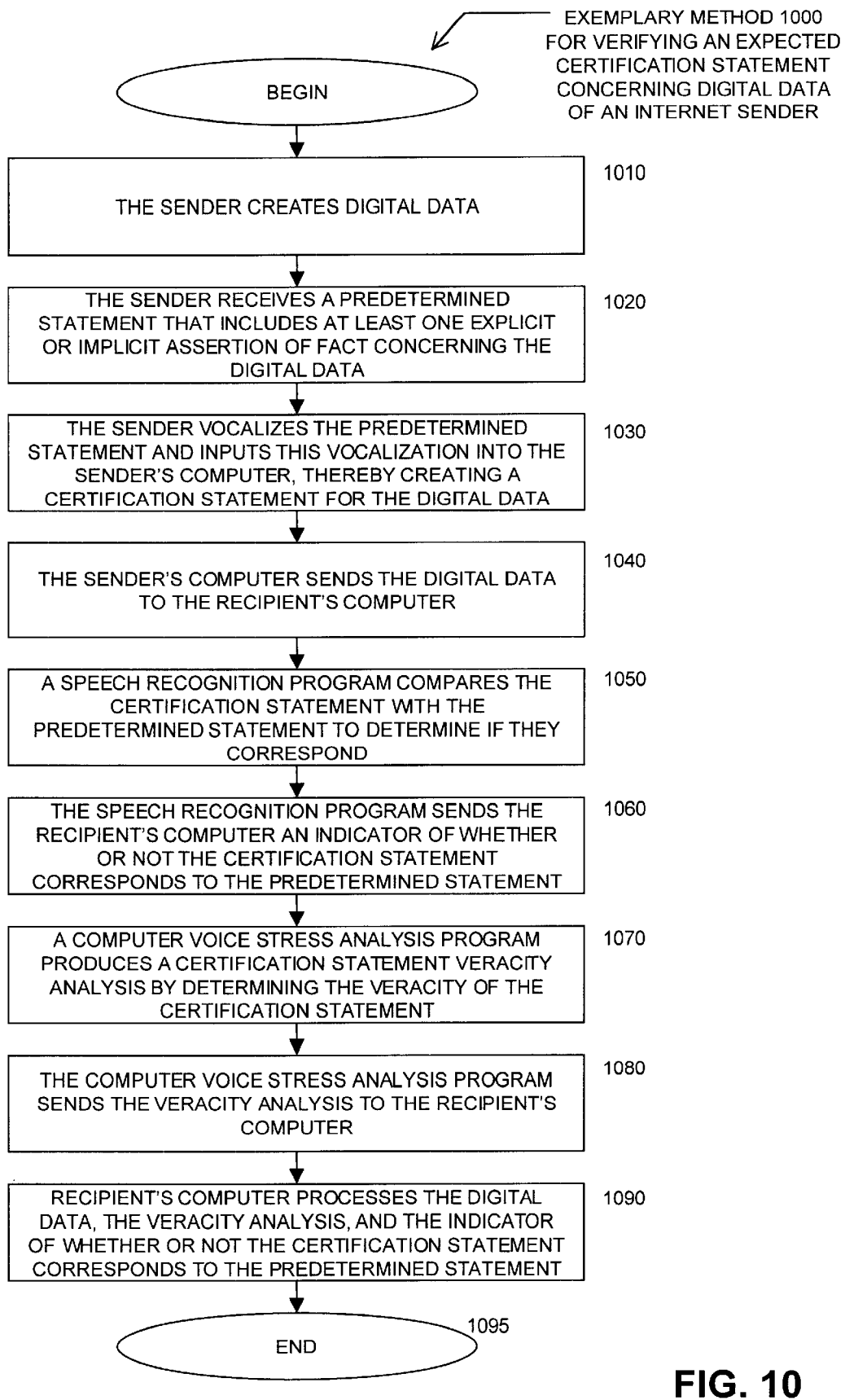
FIG. 10 is a logical flow diagram for verifying an expected certification statement concerning digital data of an Internet sender in accordance with an exemplary embodiment of the present invention.

Verifying and Analyzing an Expected Certification Statement Concerning Digital Data of an Internet Sender FIG. 10 is a logical flow diagram illustrating the steps in an exemplary method 1000 for verifying and analyzing an expected certification statement 150 concerning digital data 140 sent over the Internet 130 by a sender 110. FIG. 9 is a block diagram illustrating the flow of data 900 between the entities 110, 120, 520, and 310 involved in the exemplary method 1000. With reference to FIGS. 9 and 10, the detailed description now describes the steps of the exemplary method 1000, which begins in step 1010.

In step 1010, the sender 110 creates digital data 140 at the sender's computer. In step 1020, the sender 110 receives a predetermined statement 910 that includes at least one explicit or implicit assertion of fact concerning the digital data 140. The recipient 120, the intermediary computer server 160, or the sender's computer may select and provide this predetermined statement 910 to the sender 110.

In step 1030, the sender 110 vocalizes the predetermined statement 910 and inputs this vocalization into the sender's computer. This vocalization of the predetermined statement 910 serves as a certification statement 150 for the digital data 140. In step 1040, the sender's computer sends the digital data 140 to the recipient's computer.

In step 1050, a speech recognition program 520 compares the certification statement 150 with the predetermined statement 910 to determine if they correspond. In step 1060, the speech recognition program 520 sends the recipient's computer an indicator 920 of whether or not the certification statement 150 corresponds to the predetermined statement 910.

In step 1070, a computer voice stress analysis program 310 determines the veracity of the certification statement 150 and produces an indication 320 of the veracity of the certification statement. In step 1080, the computer voice stress analysis program 310 sends the indication 320 of the veracity of the certification statement 150 to the recipient's computer.

In step 1090, the recipient's computer processes the digital data 140, the indication 320 of the veracity of the certification statement 150, and the indicator 920 of whether or not the certification statement corresponds to the predetermined statement 910. This may include providing the digital data 140 to the recipient 120 if the recipient comprises an individual, the indication 320 indicates that the certification statement 150 is truthful, and the indicator 920 indicates that the certification statement corresponds to the predetermined statement 910. The routine then ends in step 1095.

In FIGS. 9 and 10, the speech recognition program 520 and the computer voice stress analysis program 310 may each be located at the sender's computer, at the recipient's computer, or at the intermediary computer server 160. The recipient 120 can comprise an individual at a computer connected to the Internet 130 or the recipient can itself comprise a computer server that has a need for the digital data 140.

Numerous applications of method 1000 will occur to those skilled in the art. In one application of the method 1000, the digital data 140 comprises data the sender 110 enters for a Web page form provided by the computer server 120 (the recipient). The computer server 120 provides the sender 110 with the following predetermined statement 910: "I believe the information I entered into this Web page form is complete and accurate." By vocalizing the predetermined statement 910, the sender 110 creates a certification statement 150. Upon receiving the certification statement 150, the recipient computer server 120 can determine if the certification statement is truthful (by applying computer voice stress analysis) and if the certification statement matches the predetermined statement 910 (by using speech recognition). If the certification statement 150 is truthful and if the certification statement matches the predetermined statement 910, then the computer server 120 knows that the sender 110 has entered truthful data 140 into the Web page form and processes the data accordingly.

In another application of the method 1000, the digital data 140 comprises an indication (such as a mouse click) from the sender 110 that the sender wants to access restricted-access data, such as a Web page or file, on the Web site 120 (the recipient). The Web site 120 then provides the sender 110 with a predetermined statement 910 that the sender meets stated authorization criteria for accessing the restricted-access data, such as meeting a minimum age requirement. By vocalizing the predetermined statement 910, the sender 110 creates a certification statement 150 concerning the indication 140 of the sender's desire to access the restricted-access data. The Web site 120 then determines if the certification statement 150 is truthful (by applying computer voice stress analysis) and if the certification statement corresponds to the predetermined statement 910 (by using speech recognition). If the certification statement 150 is truthful and if the certification statement corresponds to the predetermined statement 910, then the Web site 120 grants the sender 110 access to the restricted-access data because the sender meets the authorization criteria.

Auction Process Incorporating Truth-Enablement of the Item Description

Figure 11:
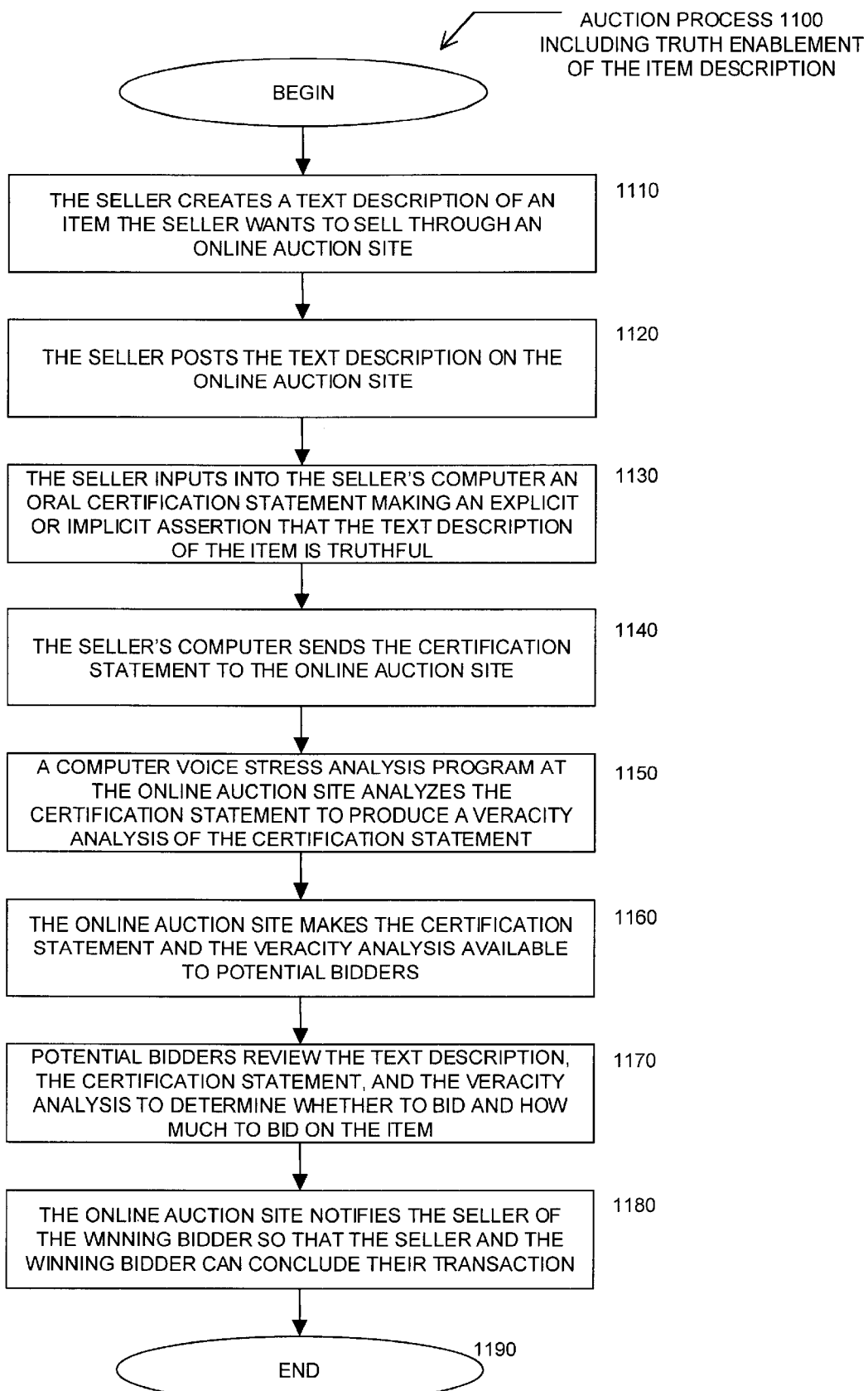
FIG. 11 is a logical flow diagram of an auction process that incorporates truth-enablement of the item description in accordance with an exemplary embodiment of the present invention.

FIG. 11 is an exemplary online auction process 1100 that incorporates truth-enablement of the item description. FIG. 11 refers to a specific embodiment of the invention shown in FIGS. 1, 2, and 3.

In step 1110, the seller 110 creates a text description 140 of an item the seller wants to sell through an online auction site 160. In step 1120, the seller 110 posts the text description 140 on the online auction site 160.

In step 1130, the seller 110 inputs into the seller's computer an oral certification statement 150 making an explicit or implicit assertion that the text description 140 of the item is truthful. An implicit assertion would comprise a vocalization by the seller 110 of the text description 140.

In step 1140, the seller's computer sends the certification statement 150 to the online auction site 160. In step 1150, a computer voice stress analysis program 310 at the online auction site 160 analyzes the certification statement 150 to determine the veracity of the certification statement. In step 1160, the online auction site 160 makes the certification statement 150 and an indication 320 of the veracity of the certification statement available to potential bidders on the item.

In step 1170, the potential bidders review the text description 140, the certification statement 150, and the indication 320 of the veracity of the certification statement. With this information, the potential bidders determine whether to bid and how much to bid on the item.

In step 1180, the online auction site 160 notifies the seller 110 of the winning bidder 120 so that the seller and the winning bidder can conclude their transaction. The process 1100 ends in step 1190.

CONCLUSION

The detailed description has described several methods for truth-enabling communications over a computer network. Other alternative embodiments will become apparent to those skilled in the art to which an exemplary embodiment pertains without departing from its spirit and scope. Accordingly, the scope of the present invention is defined by the appended claims rather than the foregoing description.

The invention claimed is:

1. A method for truth-enabling communications over a computer network, comprising:
   receiving a text message from a sender at a first computer of the computer network;
   receiving from the sender speech input indicating a veracity of the text message;
   determining the veracity of the text message from the speech input; and
   transmitting the text message over the computer network to a recipient.

2. The method of claim 1, wherein determining the veracity of the text message from the speech input comprises applying computer voice stress analysis to the speech input.

3. The method of claim 1, further comprising providing the speech input to the recipient so that the recipient can listen to the speech input in order to determine an applicability of the speech input to the text message.

4. The method of claim 1, wherein transmitting the text message over the computer network to the recipient comprises:
   receiving the text message from the first computer over the computer network at an intermediary computer server; and
   at the intermediary computer server, making the text message remotely accessible by the recipient.

5. A computer-readable medium having computer-executable instructions for performing the method of claim 1.

6. A computer system adapted to perform the method of claim 1.

7. The method of claim 1, wherein the speech input indicating the veracity of the text message comprises an explicit assertion that the text message is truthful.

8. The method of claim 1, wherein the speech input indicating the veracity of the text message comprises a vocalization by the sender of a portion of the text message, thereby causing the speech input to comprise an implicit assertion that the portion of the text message is truthful.

9. The method of claim 1, further comprising indicating to the recipient the veracity of the text message.

10. The method of claim 1, wherein determining the veracity of the text message from the speech input comprises determining a likelihood of truthfulness of a portion of the speech input using computer voice stress analysis.

11. The method of claim 10, wherein determining the veracity of the text message from the speech input comprises calculating a likelihood of truthfulness of the text message by combining the likelihood of truthfulness of the portion of the speech input with a likelihood of truthfulness of other portions of the speech input.

12. The method of claim 1, further comprising verifying a content of the speech input through speech recognition.

13. The method of claim 1, wherein transmitting the text message over the computer network to the recipient comprises providing the text message to the recipient only if the speech input indicates that the text message is truthful.

14. The method of claim 1, wherein the recipient comprises a second computer of the computer network.

15. The method of claim 1, wherein the recipient comprises an individual at a second computer of the computer network.

16. The method of claim 1, wherein determining the veracity of the text message from the speech input comprises providing the speech input to a computer voice stress analysis program.

17. The method of claim 1, wherein transmitting the text message over the computer network to the recipient comprises:
   receiving the text message from the first computer from over the computer network at an intermediary computer server; and
   transmitting the text message from the intermediary computer server over the computer network to a computer of the recipient.

18. The method of claim 1, wherein determining the veracity of the text message from the speech input comprises applying computer voice stress analysis to the speech input at an intermediary computer server.

19. The method of claim 1, wherein determining the veracity of the text message from the speech input comprises determining the veracity of the speech input using computer voice stress analysis at the first computer of the computer network.

20. The method of claim 1, wherein determining the veracity of the text message from the speech input comprises determining the veracity of the speech input using computer voice stress analysis at a computer of the recipient.

21. The method of claim 1, wherein the text message is included in an e-mail.

22. The method of claim 1, wherein transmitting the text message over the computer network to the recipient comprises:
   receiving the text message from over the computer network at an intermediary computer server;
   making the text message available on a message board offered by the intermediary computer server;
   receiving an indication from the recipient that the recipient wants to read the text message; and
   displaying the text message for the recipient to read.

23. The method of claim 1, wherein the text message comprises an ad for an online auction site, the speech input indicates the veracity of the ad, and transmitting the text message over the computer network to the recipient comprises:
   receiving the ad from over the computer network at the online auction site;
   at the online auction site, making the ad available for viewing by potential bidders;
   receiving an indication from the recipient that the recipient wants to view the ad; and
   displaying the ad for the recipient to read.

24. The method of claim 1, wherein the computer network comprises an Internet.

25. The method of claim 1, further comprising adding to the text message a link to a Web site from which the recipient can learn the veracity of the text message.

26. A method for truth-enabling communications over a computer network, comprising:
   receiving speech input from a sender at a first computer of the computer network;
   applying speech recognition to the speech input to create a text message corresponding to the speech input;
   determining a veracity of the text message by applying computer voice stress analysis to the speech input;
   providing the text message to a recipient at a second computer of the computer network; and indicating to the recipient the veracity of the text message.

27. The method of claim 26, wherein determining the veracity of the text message by applying computer stress analysis to the speech input comprises:
dividing the speech input into a plurality of portions; and
applying computer voice stress analysis to each portion of the speech input to determine a veracity of each portion;
and wherein indicating to the recipient the veracity of the text message comprises:
dividing the text message into a plurality of portions corresponding to the portions of the speech input;
assigning a color to each portion of the text message indicating the veracity of the corresponding portion of the speech input; and
displaying the text message to the recipient whereby each portion of the text message has the assigned color.

28. A computer-readable medium having computer-executable instructions for performing the method of claim 26.

29. A computer system adapted to perform the method of claim 26.

30. A method for truth-enabling communications over a computer network, comprising:
receiving a text message from a sender at a first computer of the computer network;
receiving speech input from the sender;
verifying that the speech input comprises a vocalization of the text message using speech recognition;
determining a veracity of the text message by applying computer voice stress analysis to the speech input; and
transmitting the text message over the computer network to a recipient at a second computer of the computer network.

31. A computer-readable medium having computer-executable instructions for performing the method of claim 30.

32. A computer system adapted to perform the method of claim 30.

33. A method for truth-enabling communications over a computer network, comprising:
providing a sender at a first computer of the computer network with a predetermined statement including at least one assertion of fact concerning digital data of the sender;
receiving the digital data from the sender;
receiving speech input from the sender;
using speech recognition to verify that the speech input comprises a vocalization of the predetermined statement;
determining a veracity of the assertion of fact by applying computer voice stress analysis to the speech input; and
transmitting the digital data over the computer network to a recipient.

34. The method of claim 33, wherein the recipient comprises a Web server, the digital data comprises information supplied by the sender to a Web page form provided by the Web server, and the assertion of fact comprises an assertion that the information supplied by the sender is truthful.

35. A computer-readable medium having computer-executable instructions for performing the method of claim 33.

36. A computer system adapted to perform the method of claim 33.

37. A method for restricting access to data stored on a computer network, comprising:
receiving an indication from a user of the computer network that the user wants to access the data;
providing the user with a predetermined statement;
receiving speech input from the user;
using speech recognition to determine if the speech input comprises the predetermined statement;
applying computer voice stress analysis to the speech input to determine if the speech input is truthful; and
if the speech input comprises the predetermined statement and the speech input is truthful, then allowing the user to access the data.

38. The method of claim 37, wherein the predetermined statement comprises an assertion that the user is authorized to access the data.

39. The method of claim 37, wherein the predetermined statement comprises an assertion that the user meets a predetermined age requirement.

40. The method of claim 37, wherein the data is located remotely from the user.

41. The method of claim 37, wherein the computer network is an Internet.

42. A computer-readable medium having computer-executable instructions for performing the method of claim 37.

43. A computer system adapted to perform the method of claim 37.

44. A method for truth-enabling an online auction, comprising:
receiving from a creator of an online auction advertisement speech input indicating a veracity of the advertisement;
determining the veracity of the advertisement by applying computer voice stress analysis to the speech input; and
indicating the veracity of the advertisement to a potential bidder on an item corresponding to the advertisement.

45. The method of claim 44, wherein receiving from the creator of the online auction advertisement speech input indicating the veracity of the advertisement comprises receiving the speech input at a first computer server that is separate from a second computer server running the online auction.

46. A computer-readable medium having computer-executable instructions for performing the method of claim 44.

47. A computer system adapted to perform the method of claim 44.

48. A method for truth-enabling communications over a computer network, comprising:
receiving from a creator of a text message located at a first computer of the computer network speech input indicating a veracity of the text message;
determining the veracity of the text message from the speech input; and
indicating the veracity of the text message to a recipient of the text message at a second computer of the computer network.

49. The method of claim 48, wherein determining the veracity of the text message from the speech input comprises applying computer voice stress analysis to the speech input.

50. The method of claim 48, wherein the speech input comprises a vocalization of the text message by the creator.

51. The method of claim 50, further comprising:
comparing the speech input with the text message using speech recognition; and indicating to the recipient whether or not the speech input corresponds to the text message.

52. The method of claim 48, further comprising providing the speech input to the recipient so that the recipient can listen to the speech input in order to determine an applicability of the speech input to the text message.

53. The method of claim 48, wherein the text message comprises a link to a Web site through which the veracity of the text message is indicated to the recipient.

54. The method of claim 48, further comprising displaying an ad viewable by the recipient.

55. The method of claim 48, further comprising:

selecting an ad based upon a content of the text message;

displaying the ad to the recipient.

56. The method of claim 48, wherein receiving from the creator of the text message located at the first computer of the computer network the speech input indicating the veracity of the text message comprises receiving the speech input at a first computer server that is separate from a second computer server through which the text message is communicated to the recipient.

57. A computer-readable medium having computer-executable instructions for performing the method of claim 48.

58. A computer system adapted to perform the method of claim 48.

* * * * *